(12) United States Patent
Jarvis

(10) Patent No.: US 8,607,515 B2
(45) Date of Patent: Dec. 17, 2013

(54) CONNECTOR

(75) Inventor: Paul Douglas Jarvis, West Horsley (GB)

(73) Assignee: Thomasons Innovations Limited, Surrey (GB)

( * ) Notice: Subject to any disclaimer, the term of this patent is extended or adjusted under 35 U.S.C. 154(b) by 87 days.

(21) Appl. No.: 13/131,646

(22) PCT Filed: Nov. 27, 2009

(86) PCT No.: PCT/GB2009/002766
§ 371 (c)(1),
(2), (4) Date: May 27, 2011

(87) PCT Pub. No.: WO2010/061192
PCT Pub. Date: Jun. 3, 2010

(65) Prior Publication Data
US 2011/0243644 A1 Oct. 6, 2011

(30) Foreign Application Priority Data
Nov. 28, 2008 (GB) .................................. 0821814.1

(51) Int. Cl.
*E04B 1/00* (2006.01)
(52) U.S. Cl.
USPC ................ 52/253; 52/283; 52/704; 52/655.1; 52/656.9; 52/698; 52/298; 52/296; 52/707; 403/258; 403/362; 403/353
(58) Field of Classification Search
USPC ............. 52/253, 251, 283, 285.4, 285.2, 700, 52/701, 704, 707, 73, 712, 296, 139, 298, 52/295, 655.1, 656.9, 698, 256, 257, 849, 52/708; 403/187, 403, 353, 197, 362, 360; 211/191
See application file for complete search history.

(56) References Cited

U.S. PATENT DOCUMENTS

| | | | |
|---|---|---|---|
| 1,727,296 A | 10/1926 | Matte, Jr. | |
| 1,933,536 A | 11/1933 | Awbrey | |
| 3,339,750 A * | 9/1967 | Nelson-Hawkins | 211/191 |
| 3,342,005 A * | 9/1967 | Rickards et al. | 52/702 |
| 3,415,554 A * | 12/1968 | Papayoti | 403/187 |
| 3,513,610 A * | 5/1970 | Devonport | 52/283 |
| 4,523,413 A * | 6/1985 | Koppenberg | 52/139 |
| 4,831,796 A | 5/1989 | Ladduwahetty | |
| 5,548,939 A | 8/1996 | Carmical | |
| 5,678,375 A * | 10/1997 | Juola | 52/655.1 |
| 5,846,018 A * | 12/1998 | Frobosilo et al. | 403/403 |
| 6,298,629 B1 * | 10/2001 | Ador | 52/698 |

(Continued)

OTHER PUBLICATIONS

PCT International Search Report for PCT/GB2009/002766 dated Mar. 12, 2010.

(Continued)

*Primary Examiner* — Chi Q Nguyen
(74) *Attorney, Agent, or Firm* — Cook Alex Ltd.

(57) ABSTRACT

A connector comprising a container-like fastener holder (4) of finite depth with a front (6) and a rear plate and side walls (8) wherein the rear wall and substantially the whole depth of the holder can be cast into a concrete structure to form a space within the concrete structure, fastening means (12) which can assume a range of positions within the holder (4) and a moveable connection part (16) or device which can be fastened to the front plate (6) by the fastening means (12).

18 Claims, 6 Drawing Sheets

(56) References Cited

U.S. PATENT DOCUMENTS

| | | | |
|---|---|---|---|
| 6,494,639 B1 * | 12/2002 | Friend | 403/403 |
| 6,550,200 B1 * | 4/2003 | Mueller | 52/296 |
| 6,560,940 B2 * | 5/2003 | Mueller | 52/295 |
| 6,772,570 B2 * | 8/2004 | Horne | 52/655.1 |
| 7,213,376 B2 * | 5/2007 | Pulkkanen et al. | 52/283 |

OTHER PUBLICATIONS

PCT Written Opinion of the International Searching Authority for PCT/GB2009/002766 dated Mar. 12, 2010.

PCT Preliminary Report on Patentability for PCT/GB2009/002766 dated Feb. 11, 2011.

* cited by examiner

CONNECTOR

CROSS-REFERENCED TO RELATED APPLICATIONS

This is a U.S. National Stage Application of International Application No. PCT/GB2009/002766 filed on Nov. 27, 2009 which claims the benefit and priority to GB Patent Application No. 0821814.1 filed on Nov. 28, 2008. The full disclosure of GB Patent Application No. 0821814.1 and PCT/GB2009/002766 are hereby incorporated herein by referenced in their entireties.

BACKGROUND

The present invention relates to a connector for joining building elements.

In the building construction industry it is often necessary to fix a beam or other horizontal element to a wall or other vertical element or vice versa. Concrete walls or columns are well known for their strength and ease of construction. However once the concrete is hardened it becomes difficult to resiliently fix beams or other load bearing items to the wall.

The construction of a building is a precise art and a beam or horizontal element must be fixed to a wall or vertical element in the correct position. Similarly, it is often desirable to fix a vertical member to a horizontal floor or ceiling.

A known construction method comprises drilling holes into a hardened concrete structure and fixing bolts into the hole. The hole locations often clash with steel reinforcements and problems often arise on site which cause additional costs and delays in construction.

A further known construction technique for securing a horizontal beam to a vertical concrete wall involves casting bolts into the wall during construction so that the beam can be fastened to the bolts and thereby secured to the wall.

Unfortunately it is difficult to cast bolts into a vertical or horizontal member in the correct position in order to secure the horizontal or vertical member in the desired position.

SUMMARY

Accordingly, the present invention relates to a connector comprising a container-like fastener holder of finite depth with a front and a rear plate and side walls wherein the rear wall and substantially the whole depth of the holder can be cast into a concrete structure to form a space within the concrete structure, fastening means which can assume a range of positions within the holder and a moveable connection part or device which can be fastened to the front plate by the fastening means.

The front plate of the connector may comprise at least one slot able to receive the fastening means, the fastening means being able to fasten within a range of positions defined by the slot.

This provides the advantage that the slot allows a degree of freedom in the positioning of the connection part or device, enabling a beam or member to be fixed in the correct position in relation to the concrete structure.

The fastening means may comprise a frontwardly protruding bolt which is moveable within the slot whose cap is captured within the connector.

The fastening means may comprise a nut which is moveable within a guide arranged within the connector so that the nut can move along the slot. In certain embodiments, the nut is square, rectangular or elongate or has a square, rectangular or elongate washer welded thereto.

The front plate may comprise a pair of perpendicular intersecting slots allowing fastening means to move in two dimensions.

The front plate may comprise two or more pairs of slots arranged substantially horizontally or vertically with respect to each other.

The front plate may comprise four pairs of slots.

The four pairs of slots may be arranged substantially linearly or displaced vertically with respect to each other.

The front plate may comprise more than four pairs of slots.

The multiple pairs of slots allow for a strong fastening as the required force to maintain the fastening can be distributed across the fastenings.

The front plate may be formed with a toothed outside surface for improved connection between horizontal and vertical members.

The connector may be fixed to the beam or load bearing member.

A connector may be fixed to the beam or load bearing member and a second connector may be cast into the concrete structure to enable a wider range of positions.

The fastening means may form a friction lock between the connection part or device and the front plate.

The fastening means may comprise one or more high strength friction grip bolts.

The fastening means may alternatively comprise at least one tension control bolt, e.g. a stud having an additional outer nut thereon with a part which breaks when the nut reaches a pre-determined tension. This prevents the nut from being over-tightened or under-tightened.

Corresponding faces of the fastening means and front plate may be formed with interlocking teeth in order to form a stronger fastening.

The front plate of the connector may be equipped with at least one rearwardly protruding attachment means which can be cast into the concrete structure.

The rear plate of the connector may be equipped with at least one rearwardly protruding attachment means which can be cast into the concrete structure.

The attachment means may be anchor studs or reinforcing bars or reinforcing bolts.

The rearwardly protruding anchor studs, reinforcing bars or reinforcement bolts improve the strength of the fastening between the connector and the concrete structure.

In an alternative configuration, the rearwardly protruding attachment means can be attached to a further plate which in turn may comprise at least one protruding attachment means which can be cast into the concrete structure.

This configuration enables the connector to be attached to a plate which has already been cast into the concrete. This would be of particular advantage where a connection is required between a concrete structure which forms part of an outside wall and a horizontal member such as part of a balcony.

Any remaining space which surrounds the rearwardly protruding attachment means can be filled with heat insulating material.

The presence of a heat insulating material between the connector and the further plate prevents cold bridging between external building elements and internal building elements.

BRIEF DESCRIPTION OF THE DRAWINGS

Examples of connectors in accordance with the present invention will now be described herein below with reference to and as shown in the accompanying drawings, in which.

DETAILED DESCRIPTION

In the following descriptions, similar parts receive the same element numbers.

Figure 1:
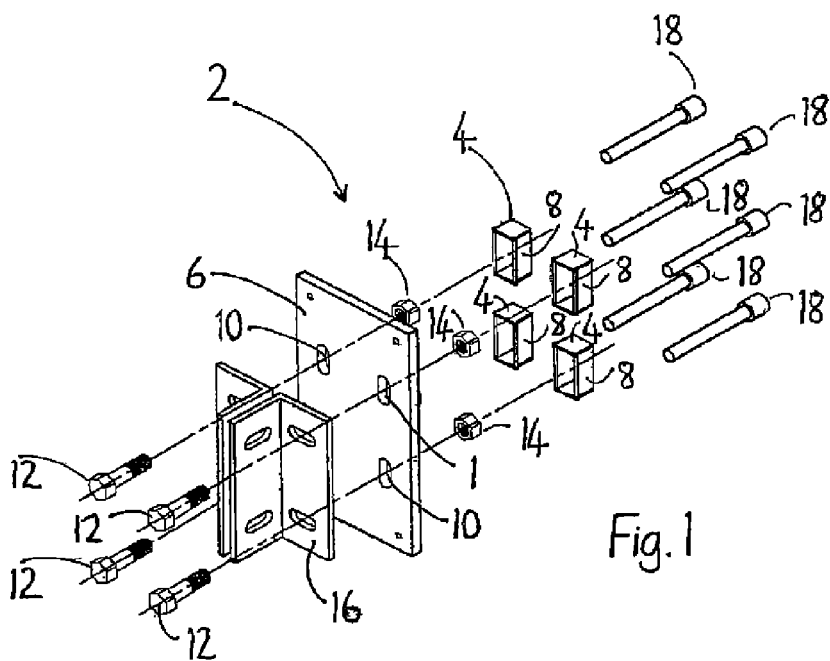
FIG. 1 shows an exploded perspective view of one embodiment of a connector according to the present invention.
Figure 1A:
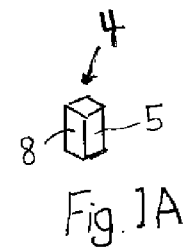
FIG. 1A is a perspective view of a container rotated 90° about a vertical axis from the orientation of the containers shown in FIG. 1.
Figure 2:
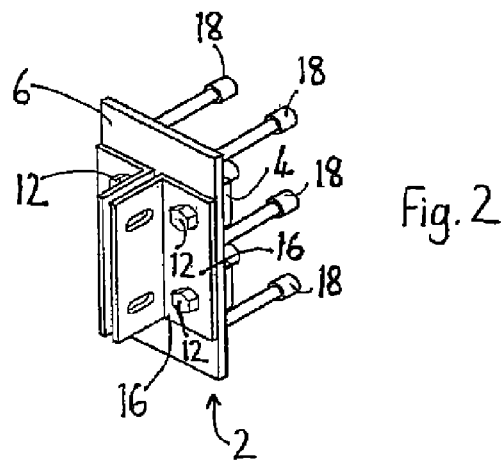
FIG. 2 shows a perspective view of the connector of FIG. 1 with fastening means attached.

FIGS. 1, 1A and 2 show a connector 2 comprising four containers 4 with a shared front plate 6 and each with a rear plate 5 (FIG. 1A) and side walls 8. The front plate 6 comprises four slots 10 (three shown) able to receive bolts 12, the bolts 12 being moveable within the slots 10. Nuts 14 are moveable within the containers 4 and can be engaged with the bolts 12 to form a strong fastening between the connector 2 and a connection part or device 16. Please note that it is possible for the connection part or device 16 to be formed on the building element to be connected. The front plate 6 is equipped with rearwardly protruding anchor studs 18 which can be inserted into a concrete structure (not shown).

The connector is cast into the concrete structure in an appropriate position to receive the intended building element. The connection part or device is then manoeuvred into position. The fastening means are moveable with respect to the connector in an x and y dimension within the range allowed by the slots in the front plate and the slots in the connection part or device. Once the connection part or device is in the desired position relative to the connector, the nuts are tightened to ensure a secure fastening.

The following embodiments are affixed in a similar manner.

Figure 3:
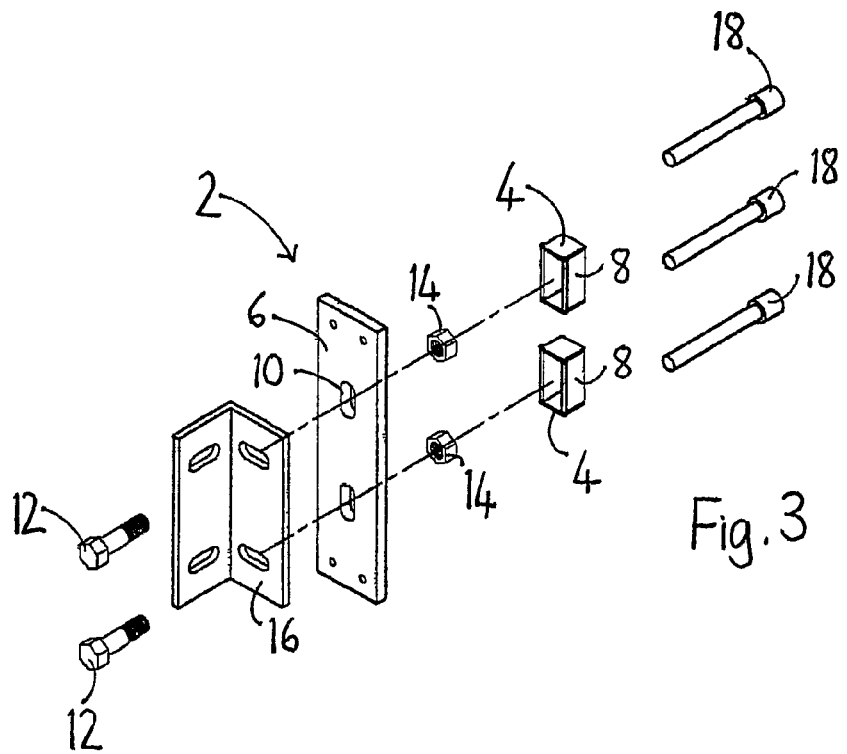
FIG. 3 shows an exploded perspective view of a further embodiment of a connector according to the present invention.
Figure 4:
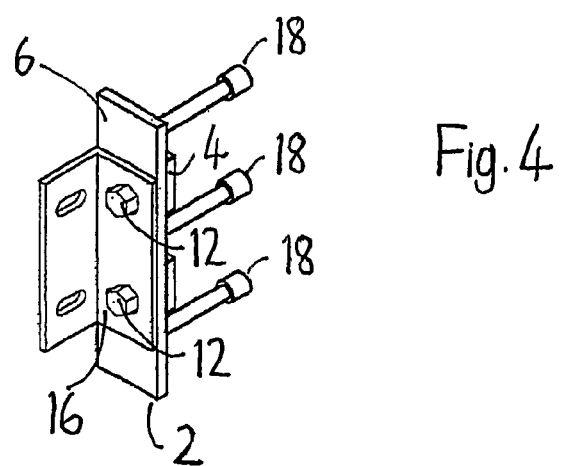
FIG. 4 shows a perspective view of the connector of FIG. 3 with fastening means attached.

FIGS. 3 and 4 show a connector 2 comprising two containers 4 with a shared front plate 6 and each with a rear plate (not shown) and side walls 8. The front plate 6 comprises two slots 10 able to receive bolts 12, the bolts 12 being moveable within the slots 10. Nuts 14 are moveable within the containers 4 and can be engaged with the bolts 12 to form a strong fastening between the connector 2 and an connection part or device 16. The front plate 6 is equipped with rearwardly protruding anchor studs 18 which can be cast into the concrete structure (not shown).

Figure 5:
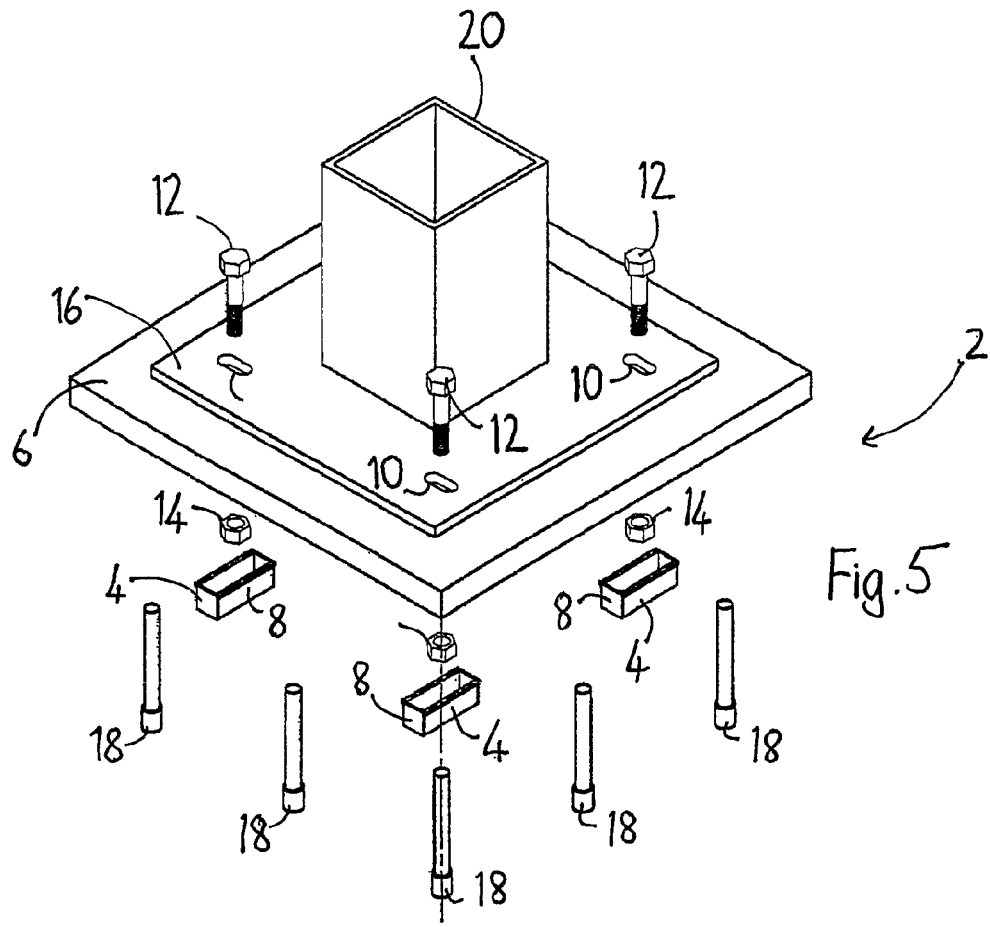
FIG. 5 shows an exploded perspective view of a further embodiment of a connector according to the present invention.
Figure 6:
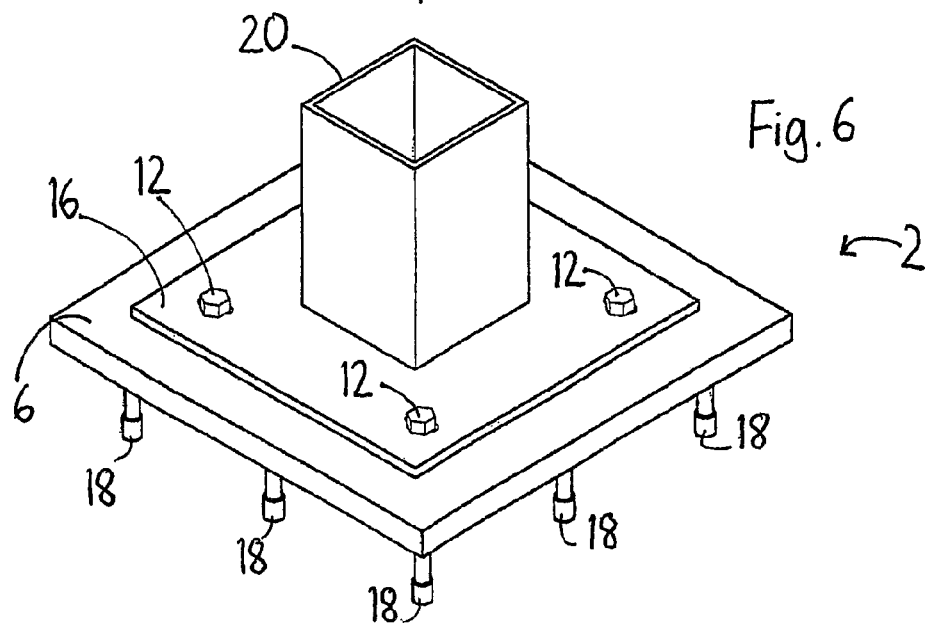
FIG. 6 shows a perspective view of the connector of FIG. 5 with fastening means attached.

FIGS. 5 and 6 show a connector 2 comprising four containers 4 (three shown) with a shared front plate 6 and each with a rear plate (not shown) and side walls 8. The front plate 6 comprises four slots 10 (three shown) able to receive bolts 12, the bolts 12 being moveable within the slots 10. Nuts 14 are moveable within the containers 4 and can be engaged with the bolts 12 to form a strong fastening between the connector 2 and an connection part or device 16. The front plate 6 is equipped with rearwardly protruding anchor studs 18 which can be inserted into the concrete structure (not shown). The connection part or device 16 can be fabricated integrally with a beam portion 20.

Figure 7:
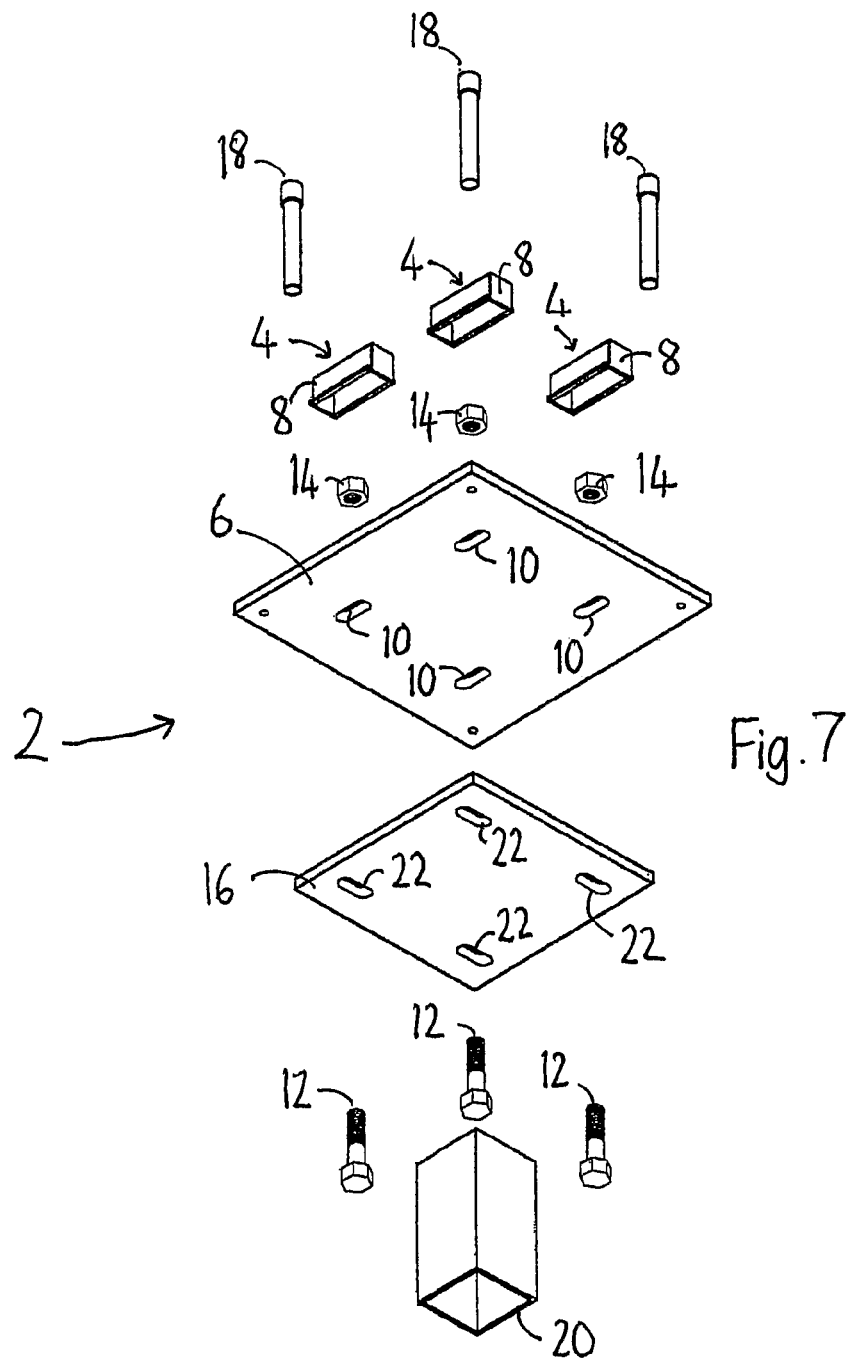
FIG. 7 shows an exploded perspective view of a further embodiment of a connector according to the present invention.

FIG. 7 shows a connector 2 comprising four containers 4 (three shown) with a shared front plate 6 and each with a rear plate (not shown) and side walls 8. The front plate 6 comprises four slots 10 able to receive bolts 12, the bolts 12 being moveable within the slots 10. Nuts 14 are moveable within the containers 4 and can be engaged with the bolts 12 to form a strong fastening between the connector 2 and an connection part or device 16. The front plate 6 is equipped with rearwardly protruding anchor studs 18 which can be inserted into the concrete structure (not shown). The connection part or device 16 comprises slots 22 which allow adjustment of the position of the connection part or device 16. The connection part or device 16 can be fabricated integrally with a beam portion 20.

Figure 8:
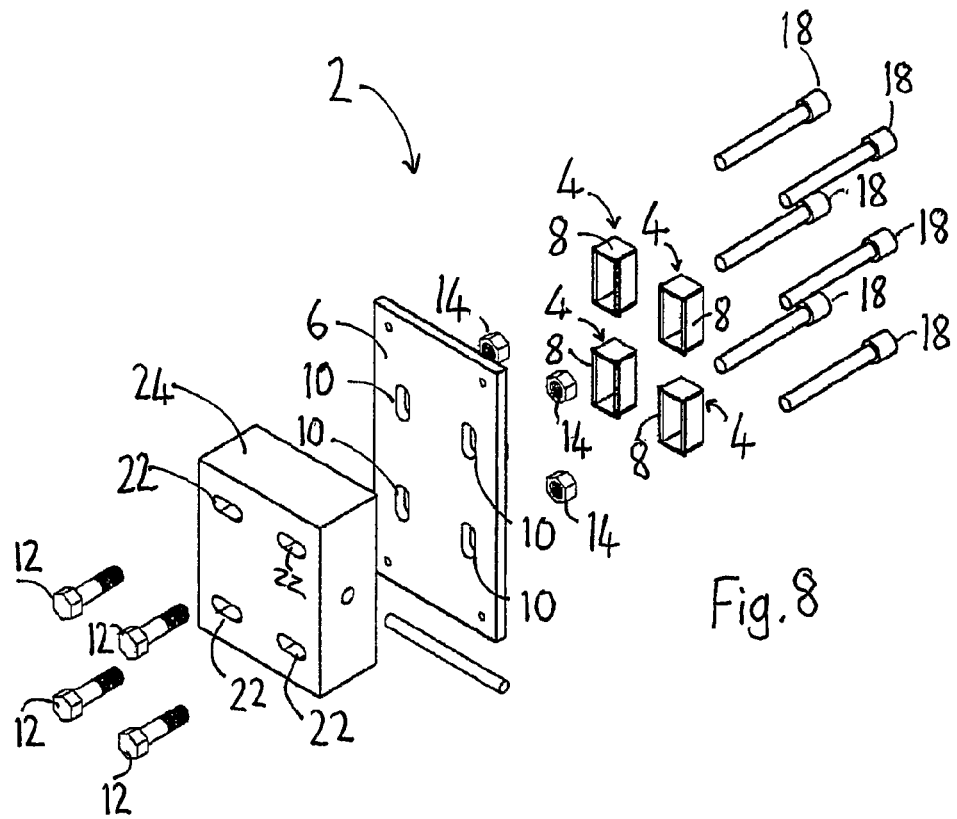
FIG. 8 shows an exploded perspective view of a further embodiment of a connector according to the present invention.
Figure 9:
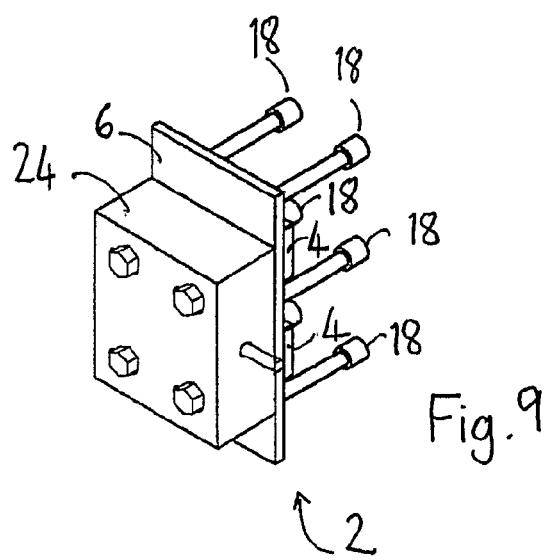
FIG. 9 shows a perspective view of the connector of FIG. 8 with fastening means attached.

FIGS. 8 and 9 show a connector 2 comprising four containers 4 with a shared front plate 6 and each with a rear plate (not shown) and side walls 8. The front plate 6 comprises four slots 10 able to receive bolts 12, the bolts 12 being moveable within the slots 10. Nuts 14 are moveable within the containers 4 and can be engaged with the bolts 12 to form a strong fastening between the connector 2 and an attachable steel block 24. The front plate 6 is equipped with rearwardly protruding anchor studs 18 which can be cast into the concrete structure (not shown). The attachable steel block 24 comprises slots 22 which allow adjustment of the position of the attachable steel block 24.

Figure 10:
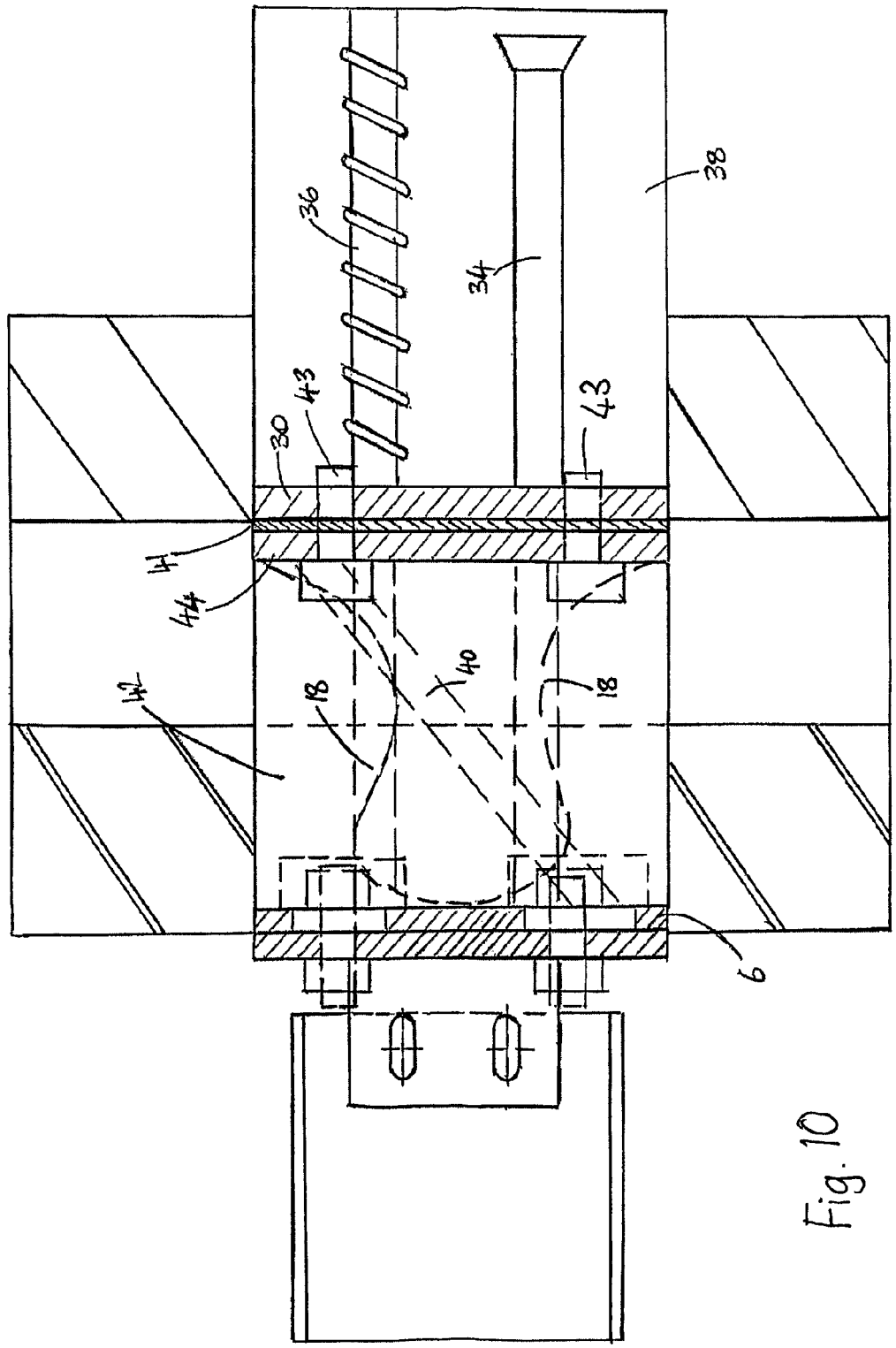
FIG. 10 shows a side view of a connector similar to that shown in FIG. 1 attached to a further configuration of plates.

FIG. 10 shows a connector similar to that shown in FIG. 1 with rearwardly protruding anchor rods 18 connecting through a cavity 42 to a second plate 44 which is in turn connected to a further plate 30 by bolts 43. Between plates 44 and 30 an insulating layer 41 may be provided, or the plates may be simply clamped together. The further plate 30 has a rearwardly protruding anchor stud 34 and a high tension rod 36 both of which are fastened into a concrete structure 38. A diagonal brace 40 is arranged so that one end is attached to the front plate 6 and the other end is attached to the second plate 44. The cavity 42 formed between the front plate 6 and the second plate 44 is filled with rigid polystyrene insulation.

Figure 11:
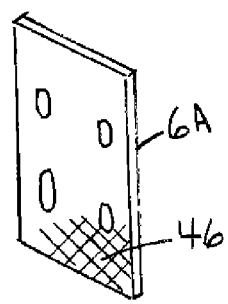
FIG. 11 is a perspective view of an alternate embodiment of a front plate having a toothed outside surface.

FIG. 11 shows an alternate front plate 6A which has a toothed or knurled portion 46 on its outside surface for improved connection between it and associated connection parts.

The invention claimed is:

1. A connector system comprising a container-like fastener holder having a depth with a front plate; said fastener holder having a rear wall and substantially the whole depth of the holder casting into a concrete structure to form a space within the concrete structure, fastening means moveably received at least partially within the holder, and a moveable connection part fastened to the front plate by the fastening means, wherein the front plate of the connector comprises at least one first slot able to receive the fastening means, the fastening means being able to fasten within a range of positions defined by the first slot, the moveable connection part comprising a second slot which together with the first slot of the front plate forms a pair of perpendicular intersecting slots allowing the moveable connection part to move in two dimensions relative to the front plate.

2. The connector system according to claim 1 wherein the fastening means comprises a frontwardly protruding bolt or stud which is moveable within the slots and has a head captured by said connector system.

3. The connector system according to claim 1 wherein the fastening means comprises a nut which is moveable within the fastener holder so that the nut can move along the slots.

4. The connector system according to claim 1 comprising two or more pairs of slots arranged substantially horizontally or vertically with respect to each other.

5. The connector system according to claim 4 comprising four pairs of slots.

6. The connector system according to claim 4 comprising more than four pairs of slots.

7. The connector system according to claim 1 wherein the front plate is formed with a toothed outside surface.

8. The connector system according to claim 1 wherein the connector is arranged to be fixed to a beam or load bearing member.

9. The connector system arrangement according to claim 1 wherein a first connector is arranged to be fixed to a beam or load bearing member and a second connector is arranged to be fixed to a wall.

10. The connector system according to claim 1 wherein the fastening means form a friction lock between the connection part or device and the front plate.

11. The connector system according to claim 1 wherein corresponding faces of the fastening means and front plate are formed with interlocking teeth.

12. The connector system according to claim 1 wherein the fastening means are high strength friction grip bolts.

13. The connector system according to claim 1 wherein the fastening means comprise tension control bolts or studs.

14. The connector system according to claim 1 wherein the front plate of the connector is equipped with at least one rearwardly protruding attachment means.

15. The connector system according to claim 14 wherein the rearwardly protruding attachment means are attached to a further plate which is inserted into a concrete structure.

16. The connector system according to claim 15, including heat insulating material between said front plate and said further plate.

17. The connector system according to claim 1 wherein the rear plate of the connector is equipped with at least one rearwardly protruding attachment means.

18. The connector system according to claim 14 or claim 17 wherein the attachment means are anchor studs or reinforcing bars or reinforcing bolts.

* * * * *

UNITED STATES PATENT AND TRADEMARK OFFICE
CERTIFICATE OF CORRECTION

PATENT NO. : 8,607,515 B2
APPLICATION NO. : 13/131646
DATED : December 17, 2013
INVENTOR(S) : Paul Douglas Jarvis It is certified that error appears in the above-identified patent and that said Letters Patent is hereby corrected as shown below:

In the Claims

Claim 1, Column 4, line 56, cancel the text beginning with "1. A connector system" to and ending "to the front plate." in column 5, line 3, and insert the following claim:

-- 1. A connector system comprising a container-like fastener holder having a depth with a front plate; said fastener holder having a rear wall and side walls wherein the rear wall and substantially the whole depth of the holder form a space within a concrete structure when the fastener holder is cast into a concrete structure, fastening means moveably received at least partially within the holder with a portion of the fastening means being captured in the holder such that said portion of the fastening means cannot be removed from the holder, and a moveable connection part fastened to the front plate by the fastening means, wherein the front plate of the connector comprises at least one first slot able to receive the fastening means, the fastening means being able to fasten within a range of positions defined by the first slot, the moveable connection part comprising a second slot which together with the first slot of the front plate forms a pair of perpendicular intersecting slots allowing the moveable connection part to move in two dimensions relative to the front plate. --

Signed and Sealed this
Fifteenth Day of April, 2014

Michelle K. Lee
*Deputy Director of the United States Patent and Trademark Office*